United States Patent
Didelot et al.

(10) Patent No.: US 8,813,489 B2
(45) Date of Patent: Aug. 26, 2014

(54) INTERNAL COMBUSTION ENGINE CHARGE AIR COOLER PRECOOLER

(75) Inventors: David R. Didelot, Asbury, IA (US); Douglas J. Send, Dubuque, IA (US); Jonathan A. Dylhoff, Dubuque, IA (US); Paul A. Wantschik, Platteville, WI (US)

(73) Assignee: Deere & Company, Moline, IL (US)

( * ) Notice: Subject to any disclaimer, the term of this patent is extended or adjusted under 35 U.S.C. 154(b) by 462 days.

(21) Appl. No.: 13/027,988

(22) Filed: Feb. 15, 2011

(65) Prior Publication Data

US 2012/0204555 A1    Aug. 16, 2012

(51) Int. Cl.

| F01P 1/06 | (2006.01) |
|---|---|
| F01P 7/00 | (2006.01) |
| F01P 7/14 | (2006.01) |
| F01P 5/10 | (2006.01) |
| F01P 7/16 | (2006.01) |
| F02M 15/00 | (2006.01) |
| F02B 33/00 | (2006.01) |
| F02B 33/44 | (2006.01) |
| F02B 29/04 | (2006.01) |
| F02M 25/07 | (2006.01) |

(52) U.S. Cl.
CPC ........... F02B 29/0443 (2013.01); *Y02T 10/121* (2013.01); F02M 25/0707 (2013.01); F02M 25/0727 (2013.01); F02B 29/0475 (2013.01); *Y02T 10/146* (2013.01)
USPC ................. 60/605.1; 123/41.01; 123/41.02; 123/41.44; 123/41.47; 123/542; 123/563; 60/598; 60/599

(58) Field of Classification Search
USPC ........................................................ 123/542
See application file for complete search history.

(56) References Cited

U.S. PATENT DOCUMENTS

| 3,134,371 | A | * | 5/1964 | Crooks ..................... 123/41.31 |
|---|---|---|---|---|
| 4,317,439 | A | * | 3/1982 | Emmerling .................. 123/563 |
| 4,352,456 | A | * | 10/1982 | Brandenburg, Jr. ...... 237/12.3 R |
| 5,036,668 | A | * | 8/1991 | Hardy ............................. 60/599 |
| 6,510,690 | B2 | * | 1/2003 | Furukawa et al. ............. 60/599 |
| 6,758,266 | B1 | * | 7/2004 | Sjunnesson ................... 165/299 |
| 8,336,528 | B2 | * | 12/2012 | Hori et al. ................ 123/568.12 |
| 2004/0020204 | A1 | * | 2/2004 | Callas et al. ................... 60/612 |
| 2005/0006048 | A1 | * | 1/2005 | Vuk ................................ 165/41 |
| 2006/0037590 | A1 | * | 2/2006 | Uzkan et al. ................. 123/563 |
| 2007/0227141 | A1 | * | 10/2007 | Ma et al. ......................... 60/599 |
| 2007/0272173 | A1 | * | 11/2007 | Reckels et al. ............. 123/41.11 |
| 2008/0295811 | A1 | * | 12/2008 | Holler et al. ................. 123/542 |
| 2009/0020079 | A1 | * | 1/2009 | Muller et al. ................ 123/41.1 |
| 2009/0050117 | A1 | * | 2/2009 | Tai et al. ....................... 123/542 |
| 2010/0006043 | A1 | * | 1/2010 | Kardos et al. .............. 123/41.01 |

(Continued)

FOREIGN PATENT DOCUMENTS

JP     2006299825 A  * 11/2006

*Primary Examiner* — Thomas Denion
*Assistant Examiner* — Jessica Kebea
(74) *Attorney, Agent, or Firm* — Quarles & Brady LLP

(57) ABSTRACT

A work machine having an air-breathing, fuel-consuming, liquid-cooled internal combustion (IC) engine and a turbocharger receiving combustion products from the IC engine and a compressor for pressurizing air to the IC engine. A primary heat exchanger is in fluid flow connection between the compressor and the IC engine and a secondary heat exchanger is in fluid flow connection between the compressor and the IC engine and is upstream of the primary heat exchanger. The secondary heat exchanger is an air-to-liquid heat exchanger and receives liquid coolant from the IC engine.

10 Claims, 2 Drawing Sheets

(56) References Cited

U.S. PATENT DOCUMENTS

| | | | |
|---|---|---|---|
| 2010/0095908 A1* | 4/2010 | Deivasigamani | 123/41.1 |
| 2010/0095909 A1* | 4/2010 | Lin et al. | 123/41.02 |
| 2011/0041814 A1* | 2/2011 | Kardos et al. | 123/563 |
| 2011/0088668 A1* | 4/2011 | Kardos et al. | 123/563 |
| 2011/0185991 A1* | 8/2011 | Sheidler et al. | 123/41.09 |
| 2013/0068202 A1* | 3/2013 | Kardos et al. | 123/563 |

* cited by examiner

INTERNAL COMBUSTION ENGINE CHARGE AIR COOLER PRECOOLER

FIELD OF THE INVENTION

The present invention relates to internal combustion engines, and, more specifically, to such engines having precooling circuits in the intake air connection.

BACKGROUND OF THE INVENTION

Over the years, the preferred power source for work machines has been a diesel engine owing to its durability, power output, and fuel economy. As emissions regulations have been applied to off road work machines to reduce oxides of nitrogen and particulates, the fundamental nature of the fluid passing through the engine has changed. Particularly, the intake air resulting from exhaust gas recirculation (EGR) has caused the inlet air temperature to increase substantially. Under certain conditions, the inlet air exceeds the ability of conventional devices' material temperature limitations. Typically, a diesel engine is turbocharged so that the density of the air consumed by the engine is significantly greater than atmospheric. With the increase in pressure, there is also an increase in temperature. When the emissions treatment is added to the normal temperature increase, the inlet to a charge air cooler that is typically used to cool the inlet air and, thus, increase its density, in some cases, approaches or exceeds the material limits of the components. Specifically, the flexible couplings to the inlet of the charge air cooler may be subjected to temperatures beyond their capability. In addition, the internal structure of the charge air cooler, which is typically an air-to-air heat exchanger, may be exceeded.

What is needed in the art, therefore, is the reduction of the inlet air to a charge air cooler allowing better accommodation of the temperature experienced by the component.

SUMMARY

In one form, the invention includes a power system with an air-breathing, fuel-consuming, liquid-cooled internal combustion (IC) engine providing a rotary power output and producing products of combustion. At least one turbocharger has a turbine for receiving the products of combustion and a compressor driven by the turbine for pressurizing air for delivery to the IC engine. A primary heat exchanger is in air flow connection to and interposed between the compressor and the IC engine and a secondary heat exchanger is also in air flow connection between the compressor and the IC engine and interposed upstream of the primary heat exchanger. The secondary heat exchanger is an air-to-liquid heat exchanger and receives liquid coolant from the IC engine.

In another form, the invention is a work machine including a frame, an operator cab and a cab heater. A power system is incorporated in said work machine and includes an air-breathing, fuel-consuming, liquid-cooled internal combustion (IC) engine providing a rotary output for the work machine and producing products of combustion. At least one turbocharger has a turbine for receiving the products of combustion and a compressor driven by the turbine for pressurizing air for delivery to the IC engine. A primary heat exchanger is in air flow connection to and interposed between the compressor and the IC engine. A secondary heat exchanger is in air flow connection between the compressor and the IC engine and interposed upstream of the primary heat exchanger. The secondary heat exchanger and the cab heater are air-to-liquid heat exchangers and receive liquid coolant from the IC engine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
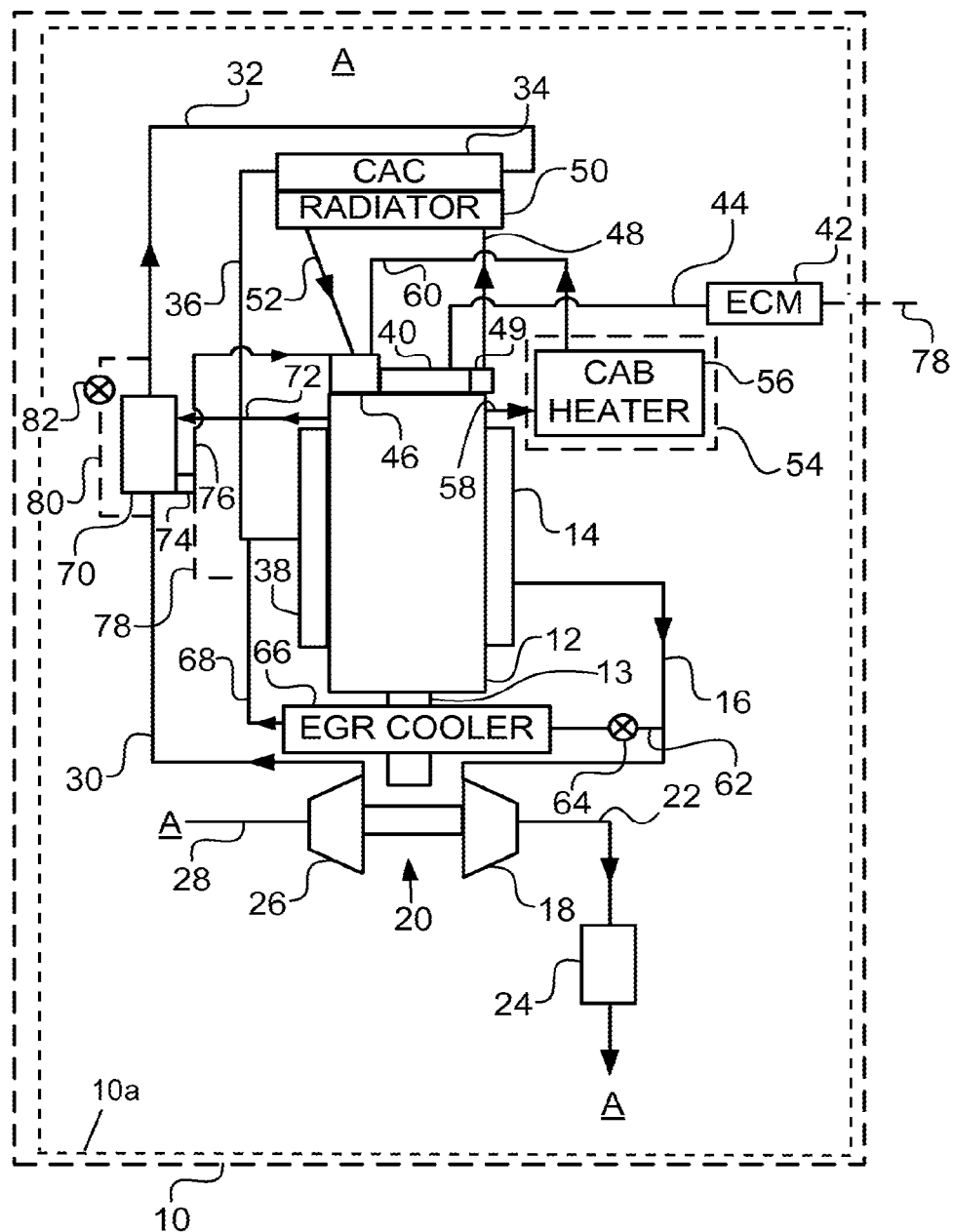
FIG. 1 is a schematic view of a work machine embodying the present invention.

Referring now to the drawings, and more particularly to FIG. 1, there is shown a work machine 10 powered by an internal combustion engine 12, which may be mounted on frame 10*a* and is preferably of the compression ignition or diesel type producing a rotary output at shaft 13. The rotary output from engine 12 provides the prime mover for work machine 10 and, in addition, provides power through accessory drive connections (not shown) to supply braking and other functions of the work machine. The work machine may be an articulated dump truck or a front loader. For each of these work machines, the prime mover duty cycle of the engine 12 is in addition to the many accessory loads supplied by the engine.

The engine 12 is an air-breathing, fuel-consuming engine that, in the diesel engine form, relies on the compression temperatures of the intake air to ignite a fuel charge producing combustion in individual cylinders, which are not shown to simplify the understanding of the invention. The cylinders are connected to a crank shaft (also not shown), to produce the rotary output at output shaft 13. Output shaft 13 is connected to transmissions or other drives (not shown) as appropriate for the work machine 10.

The products of combustion in engine 12 are exhausted through manifold 14 and from there to line 16, which extends in typical fashion to a turbine 18 of a turbocharger 20. The exhaust gases thus discharged from turbine 18 pass through line 22 to an exhaust aftertreatment device 24 and, from there, to ambient (A). Exhaust aftertreatment device 24 may take the form of a combination of particulate filtration and/or oxides of nitrogen reduction. Furthermore, the location of exhaust aftertreatment device 24 may be in line 16 upstream of the turbine 18 as appropriate.

Turbine 18 is connected to and drives a compressor 26, which receives intake air from ambient (A) and pressurizes it for delivery through line 30 and 32 extending to a charge air cooler 34 (CAC), or primary heat exchanger. Charge air cooler 34 may take a number of forms but the preferred form of the charge air cooler is an air-to-air cooler, which relies on the temperature of ambient air to cool the intake air that is passed through the charge air cooler. Downstream of the charge air cooler, there is a line 36 extending to an intake manifold 38, which supplies combustion air to the cylinders for engine 12. A fuel system, schematically represented as at 40, receives control inputs from an electronic control module 42 (ECM) via line 44 to supply fuel to the individual cylinders of engine 12 in appropriate quantities and at the appropriate time to achieve the proper balance of power, versus efficiency and emissions.

Engine 12, in typical fashion, is a liquid cooled engine and has a coolant pump 46 mechanically driven from engine 12 and which supplies liquid coolant through internal passages, which ultimately, are discharged through line 48 and a thermostat 49 to a radiator 50 of the liquid-to-air configuration. A line 52 extends from radiator 50 to the inlet of coolant pump 46. The engine 12 is also called upon to supply heat to an operator cab 54, contained within work machine 10, and specifically to a cab heater 56. The cab heater 56 is in the form of a liquid-to-air heater and receives engine coolant from engine 12 via line 58 and returns the coolant via line 60 to the inlet of pump 46.

Because of diesel engine EPA regulations, it is necessary to provide an EGR circuit to divert a selected portion of the products of combustion to the inlet of the engine 12. To this end, a line 62 extends from exhaust line 16 past a valve 64 through an EGR cooler 66 and line 68 to intake line 36. In the context of this patent application, air for combustion is deemed to contain not only ambient air A but a percentage of EGR so that when combustion air flow or fluid flow is mentioned, it may contain varying percentages of EGR. The purpose of this is to provide a selected proportion of nitrogen to the combustion mixture to reduce its temperature and, therefore, the production of oxides of nitrogen. One of the technical challenges resulting from using EGR and the other engine control parameters necessary to reduce oxides of nitrogen and particulate emissions is that the air, that has been heated by the compressor 26 in line 30, reaches a temperature that may be beyond the temperature capability of various components making up the intake line 32 extending to the charge air cooler 34. In typical fashion, some of the lines are flexibly coupled to the charge air cooler and temperatures within the intake line can exceed the capability of the materials in the flexible coupling. In addition, the temperatures can approach the material capability of the internal heat transfer passages in the charge air cooler 34.

In accordance with the present invention, an intake air precooler 70, or secondary heat exchanger, is provided between line 30 and 32 to reduce the temperature within line 32 to a point that is acceptable for the materials used in line 32 and the interstices of the charge air cooler 34. The heat exchanger 70 preferably is a liquid-to-air heat exchanger receiving coolant via line 72 from internal coolant passages downstream of coolant pump 46 for engine 12. A thermostat 74 is located adjacent heat exchanger 70 and controls coolant flow to a line 76 leading to the inlet of coolant pump 46 for engine 12.

Heat exchanger 70 provides a precooling function for combustion air delivered to line 32. The excess heat within line 30 is discharged to the liquid coolant passing ultimately to the inlet of coolant pump 46 for engine 12. By providing the thermostat 74 adjacent heat exchanger 70, the thermostat 74 can respond more quickly to changes in temperature so as to provide proper cooling of air passing through heat exchanger 70. Preferably, the heat exchanger 70 has a minimal bleed flow passing through thermostat 74 to the inlet of pump 46 so as to provide a quick response to changes in temperature. As an option, thermostat 74 may be replaced by an electronically controlled coolant valve and would be controlled from ECM 42 by line 78 indicated in dashed fashion. In addition, for certain low ambient temperature conditions, a bypass 80 for combustion air may be provided around heat exchanger 70 and controlled by valve 82. Valve 82 may receive control inputs from either the ECM or direct control, either of which would respond to temperatures in line 30 so that the temperature is appropriately controlled. The control of liquid coolant through heat exchanger 70 is manipulated so as to minimize the adverse impact on the cab heater 56 during low ambient temperature and low engine load conditions. Diesel engines are exceptionally efficient and have very little waste heat, relative to ignited gasoline engines, or other equivalents so that manipulation of the flow through the heat exchanger 70 needs to be controlled to minimize the impact on the heat available to the cab heater 56.

In operation, the engine 12 in operation provides power to the work machine 10 for propulsion and for accessory loads. The adaption of the engine 12 to meet EPA emissions limits causes the temperature of the air compressed by compressor 26 to be heated substantially. The heat exchanger 70 extracts heat from the air flow and reduces it to a level manageable for the components of the charge air cooler 34. The thermostat 74 is located adjacent the heat exchanger 70 so as to respond to rapid changes in temperature. This occurs during low ambient or low load conditions in which flow through heat exchanger 70 would cause heat from the coolant stream to transfer to the charge air stream since the charge air stream is cooler than the coolant stream. By providing a bleed flow through thermostat 74, the thermostat is more readily able to respond to rapid changes in temperature so as to open and close to regulate temperature. The optional bypass flow 80, by means of diverter valve 82 and circuit 80, is used during low ambient and low load conditions so that the heat exchanger 70 does not unnecessarily warm the air flowing to line 32.

Figure 2:
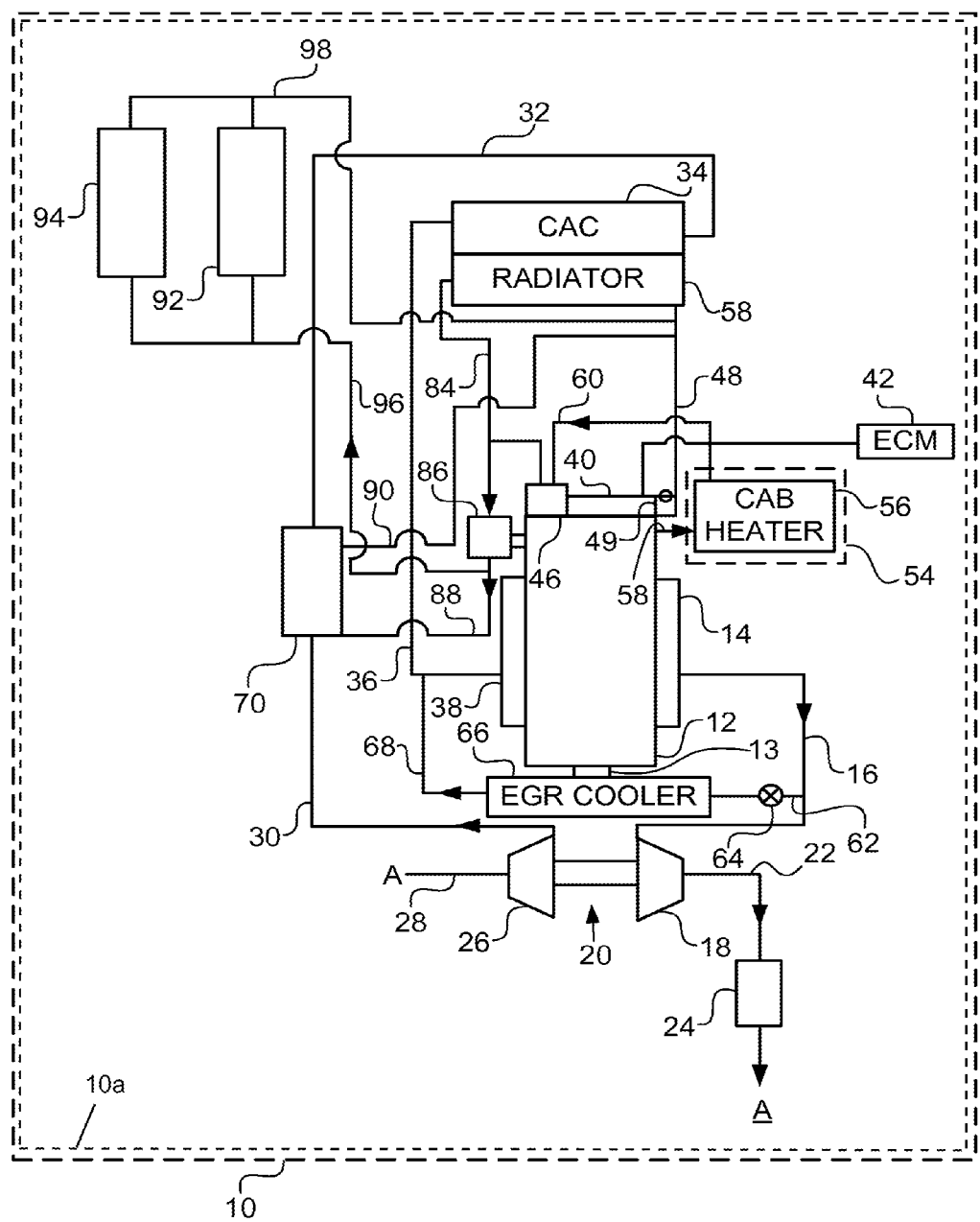
FIG. 2 is an alternate view of a work machine embodying another aspect of the present invention.

FIG. 2 shows an alternative form of the work machine of 10 (including frame 10a) but shown in an arrangement in which the precooler 70 or secondary heat exchanger is supplied with coolant from a pump other than the engine coolant pump 46. The unaltered components of the work machine are given the same reference characters as those for FIG. 1. In FIG. 2, the output from radiator 58 feeds the inlet of pump 46 via line 84 and also the inlet to a pump 86, also driven mechanically by engine 12. Pump 86 supplies liquid coolant to precooler 70 via line 88 and return flow passes to the inlet of radiator 58 via line 90 and line 48. The output of pump 86 also supplies heat generating components 92 and 94 via line 96. The return from heat generating components 92 and 94 passes via line 98 to connect with line 48 leading to the inlet of radiator 58. In this configuration, the heat generating components 92 and 94 may be motor generators of an electrically driven work vehicle 10 in which heat is generated in the process of resisting forward motions through the use of regenerative braking. The precooler 70 is in parallel liquid flow relation to the heat generating elements 92 and 94, which are cooled by radiator 58. In practice, an additional radiator may be employed in parallel flow relation to radiator 58 to provide additional cooling for the circuit. In either configuration, the precooler 70 enables a reduction in temperature in the inlet 32 to charge air cooler 34 that maintains the elements within their material limits for the flexible interconnecting components and for the internal components of charge air cooler 34.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A power system comprising:
an air-breathing, fuel-consuming, internal combustion (IC) engine cooled by a liquid coolant providing a rotary power output and producing products of combustion;
at least one turbocharger having a turbine for receiving the products of combustion from said IC engine and a compressor driven by said turbine for pressurizing air for delivery to said IC engine;
a primary heat exchanger in fluid flow connection to and interspersed between said compressor and said IC engine;
a secondary heat exchanger in fluid flow connection between said compressor and said IC engine and interposed upstream of said primary heat exchanger, said secondary heat exchanger being an air-to-liquid heat exchanger and receiving said liquid coolant from said IC engine;
a thermostat for controlling flow of said liquid coolant from said engine through said secondary heat exchanger, said thermostat being adjacent to and downstream of said secondary heat exchanger and configured to receive said liquid coolant from said secondary heat exchanger, and
a first pump connected to and driven by said IC engine to deliver said liquid coolant to said IC engine and a second liquid pump connected to and driven by said IC engine to deliver said liquid coolant to said secondary heat exchanger;
wherein said second liquid pump pumps said liquid coolant from said IC engine to a heat generating component to cool said heat generating component with said liquid coolant and said secondary heat exchanger is in parallel flow connection with said heat generating component and is also fed with said liquid coolant from said second liquid pump.

2. The power system as claimed in claim 1, wherein said primary heat exchanger is an air-to-air heat exchanger.

3. The power system as claimed in claim 1, wherein said IC engine is electronically controlled and the flow of said liquid coolant from said IC engine through said secondary heat exchanger is controlled electronically.

4. The power system as claimed in claim 1, wherein a bleed flow is provided for said liquid coolant from said IC engine through said secondary heat exchanger and said thermostat for increasing the responsiveness of said thermostat.

5. The power system as claimed in claim 1, further comprising a selective bypass around said secondary heat exchanger to control the amount of cooling during selected operating conditions.

6. A work machine comprising:
a frame;
an operator cab;
a cab heater;
an air-breathing, fuel-consuming, internal combustion (IC) engine cooled by a liquid coolant mounted in said frame and providing a rotary output and producing products of combustion;
at least one turbocharger having a turbine for receiving the products of combustion from said IC engine and a compressor driven by said turbine for pressurizing air for delivery to said IC engine;
a primary heat exchanger in fluid flow connection to and interposed between said compressor and said IC engine;
a secondary heat exchanger in fluid flow connection between said compressor and said IC engine and interposed upstream of said primary heat exchanger, said secondary heat exchanger and said cab heater being air-to-liquid heat exchangers and both receiving said liquid coolant from said IC engine; and
a thermostat for controlling a flow of said liquid coolant through said secondary heat exchanger, said thermostat being adjacent to and downstream of said secondary heat exchanger and configured to receive said liquid coolant from said secondary heat exchanger;
a coolant pump to deliver said liquid coolant to said IC engine and a separate liquid pump to deliver said liquid coolant from said IC engine to said secondary heat exchanger; and
one or more accessory components requiring cooling, said one or more accessory components being in a liquid coolant parallel flow connection with said secondary heat exchanger;
wherein said one or more accessory components are fed said liquid coolant by said separate liquid pump to provide said required cooling to said one or more accessory components via said liquid coolant.

7. The work machine of claim 6, wherein the primary heat exchanger is an air-to-air heat exchanger.

8. The work machine of claim 6, wherein IC engine is electronically controlled and the flow of said liquid coolant through said secondary heat exchanger is electronically controlled.

9. The work machine of claim 6, wherein the said secondary heat exchanger and said thermostat have a liquid coolant bleed flow therethrough to increase responsiveness to changes in temperature.

10. The work machine as claimed in claim 6, further comprising a selective bypass flow for air around said secondary heat exchanger during selected engine operating conditions.

* * * * *